United States Patent
Wang et al.

(10) Patent No.: US 12,442,961 B1
(45) Date of Patent: Oct. 14, 2025

(54) METHODS OF FORMING HOLOGRAPHIC GRATINGS FOR OPTICAL SYSTEMS

(71) Applicant: Apple Inc., Cupertino, CA (US)

(72) Inventors: Yifei Wang, Sunnyvale, CA (US);
Xiaoyong Fu, Fremont, CA (US);
Wencong Zhu, Foster City, CA (US);
Xianwei Zhao, Cupertino, CA (US);
Francesco Aieta, Alameda, CA (US);
Zhujun Shi, San Jose, CA (US);
Hyungryul Choi, San Jose, CA (US);
Zhenbin Ge, San Jose, CA (US);
Shigeto Kobori, Tokyo (JP); Yoshitaka Matsui, Yokohama (JP); Yukinori Asakawa, Saitama (JP); Jun Xie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 795 days.

(21) Appl. No.: 17/824,791

(22) Filed: May 25, 2022

Related U.S. Application Data

(60) Provisional application No. 63/225,326, filed on Jul. 23, 2021.

(51) Int. Cl.
*G02B 5/18* (2006.01)
*C23C 16/04* (2006.01)

(52) U.S. Cl.
CPC .......... *G02B 5/1819* (2013.01); *C23C 16/042* (2013.01)

(58) Field of Classification Search
None
See application file for complete search history.

(56) References Cited

U.S. PATENT DOCUMENTS

| | | | |
|---|---|---|---|
| 7,758,794 B2 | 7/2010 | Chou et al. | |
| 8,160,411 B2 | 4/2012 | Levola et al. | |
| 8,163,078 B2 | 4/2012 | Tarng et al. | |
| 8,187,771 B2 | 5/2012 | Staub et al. | |
| 9,310,566 B2 | 4/2016 | Valera et al. | |
| 9,616,614 B2 * | 4/2017 | Choi ..................... | B82Y 10/00 |
| 9,676,123 B2 | 6/2017 | Chen et al. | |
| 10,481,317 B2 | 11/2019 | Peroz et al. | |
| 10,670,971 B2 | 6/2020 | Singh et al. | |
| 10,823,894 B2 | 11/2020 | Peroz et al. | |
| 10,935,730 B1 | 3/2021 | Lou et al. | |
| 10,983,263 B2 | 4/2021 | Kleinman et al. | |

(Continued)

*Primary Examiner* — Robert E. Tallman
(74) *Attorney, Agent, or Firm* — Treyz Law Group, P.C.; Joseph F. Guihan; Jinie M. Guihan

(57) ABSTRACT

An electronic device may have a display system. The display system may include a waveguide, an input coupler, and a surface relief grating (SRG) structure. There are various ways to form a SRG structure. In one example, nanoimprinting may be performed on a low-index resin to form a mold for a subsequent deposition of high-index material. The high-index material conforms to the mold to form ridges for the SRG structure. A reusable mold may be formed with a plurality of ridges on a flexible substrate and coated by an anti-stick coating. The reusable mold may be coated with a high-index material that is attached to a glass substrate and cured to form a wafer-level SRG structure with high-index ridges on a glass substrate. The wafer-level SRG structure is subsequently diced. SRG structures may also be formed that include varying trough thicknesses, varying ridge thicknesses, and/or a sloped substrate.

21 Claims, 14 Drawing Sheets

(56) References Cited

U.S. PATENT DOCUMENTS

| | | |
|---|---|---|
| 11,391,870 B2 | 7/2022 | Rahomaki et al. |
| 11,460,609 B2 | 10/2022 | Peroz et al. |
| 2016/0033784 A1 | 2/2016 | Levola et al. |
| 2016/0167422 A1 | 6/2016 | Brehm et al. |
| 2019/0235142 A1* | 8/2019 | Meyer Timmerman Thijssen ...... B29D 11/00769 |
| 2020/0209483 A1 | 7/2020 | Mohanty |
| 2020/0400951 A1* | 12/2020 | Zhang .................. G02B 6/0016 |
| 2021/0072437 A1 | 3/2021 | Singh et al. |
| 2021/0141146 A1* | 5/2021 | Melli ................... G02B 6/0063 |
| 2021/0157148 A1 | 5/2021 | Lou et al. |
| 2021/0197507 A1 | 7/2021 | Lan et al. |
| 2022/0128817 A1 | 4/2022 | Singh et al. |

* cited by examiner

METHODS OF FORMING HOLOGRAPHIC GRATINGS FOR OPTICAL SYSTEMS

This application claims priority to U.S. provisional patent application No. 63/225,326, filed Jul. 23, 2021, which is hereby incorporated by reference herein in its entirety.

BACKGROUND

This disclosure relates generally to optical systems and, more particularly, to optical systems for electronic devices with displays.

Electronic devices often include displays that present images close to a user's eyes. For example, virtual and augmented reality headsets may include displays with optical elements that allow users to view the displays.

Devices such as these can be challenging to design. If care is not taken, the components used to display images in these devices can be unsightly and bulky and may not exhibit a desired optical performance.

SUMMARY

An electronic device may have a display system. The display system may include a waveguide, an input coupler, and a surface relief grating (SRG) structure. The input coupler may couple image light into the waveguide. The image light may propagate down the waveguide via total internal reflection. The SRG structure may perform a cross-coupling operation in which the SRG structure expands the image light in a direction perpendicular to the direction of propagation. The SRG structure may also perform an output coupling operation in which the SRG structure couples the expanded image light out of the waveguide and towards an eye box. The SRG structure may be modulated across its lateral area to maximize the optical efficiency of the system.

There are various ways to form a SRG structure. In one example, nanoimprinting may be performed on a low-index resin to form a mold for a subsequent deposition of high-index material. The high-index material conforms to the mold to form ridges for the SRG structure.

A reusable mold may be formed with a plurality of ridges on a flexible substrate and coated by an anti-stick coating. The reusable mold may be coated with a high-index material that is attached to a glass substrate and cured to form a wafer-level SRG structure with high-index ridges on a glass substrate. The wafer-level SRG structure is subsequently diced.

SRG structures may also be formed that include varying trough thicknesses, varying ridge thicknesses, and/or a sloped substrate.

DETAILED DESCRIPTION

Figure 1:
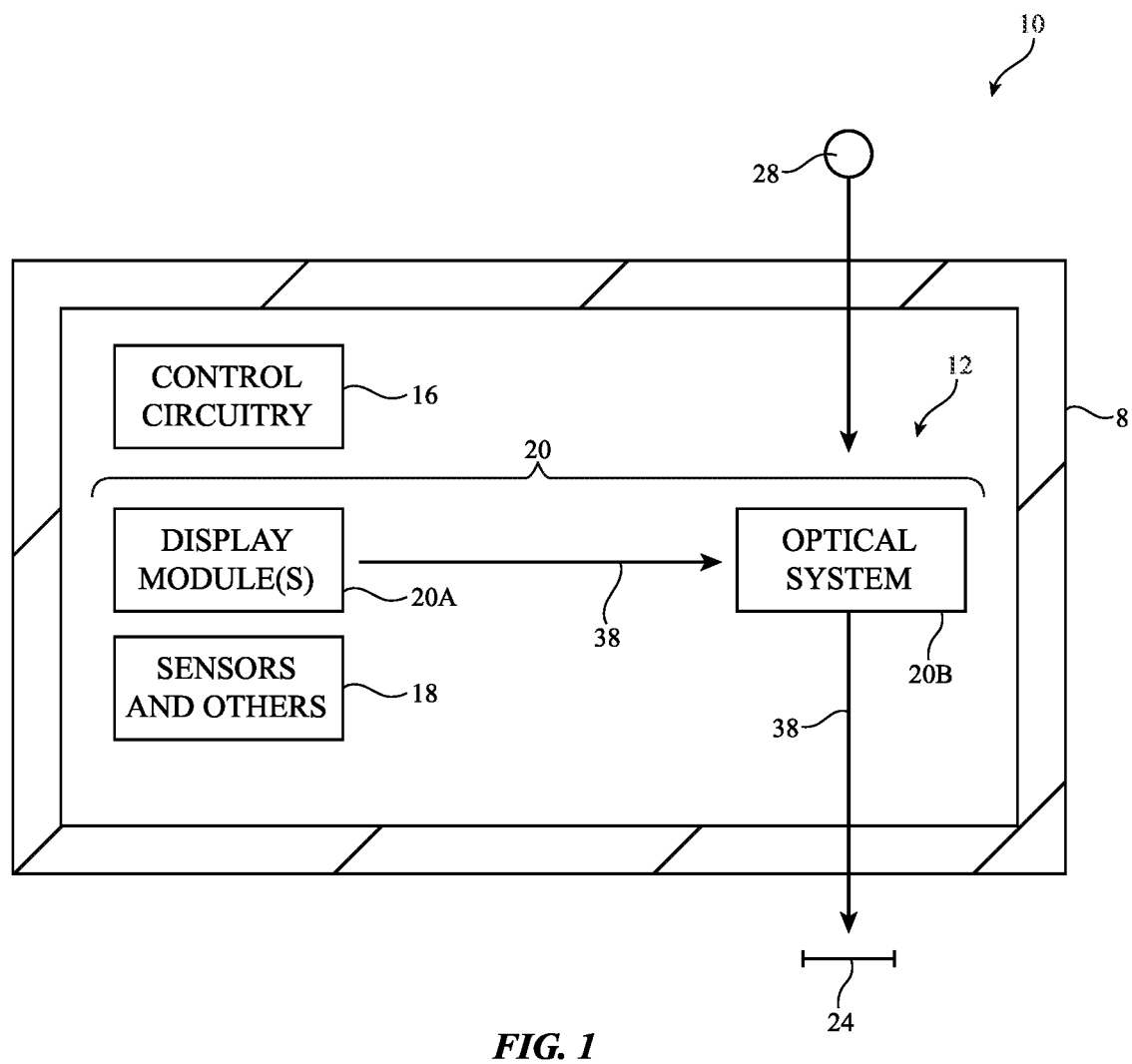
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 8. Support structure 8 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, or displays of other types. Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 28 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
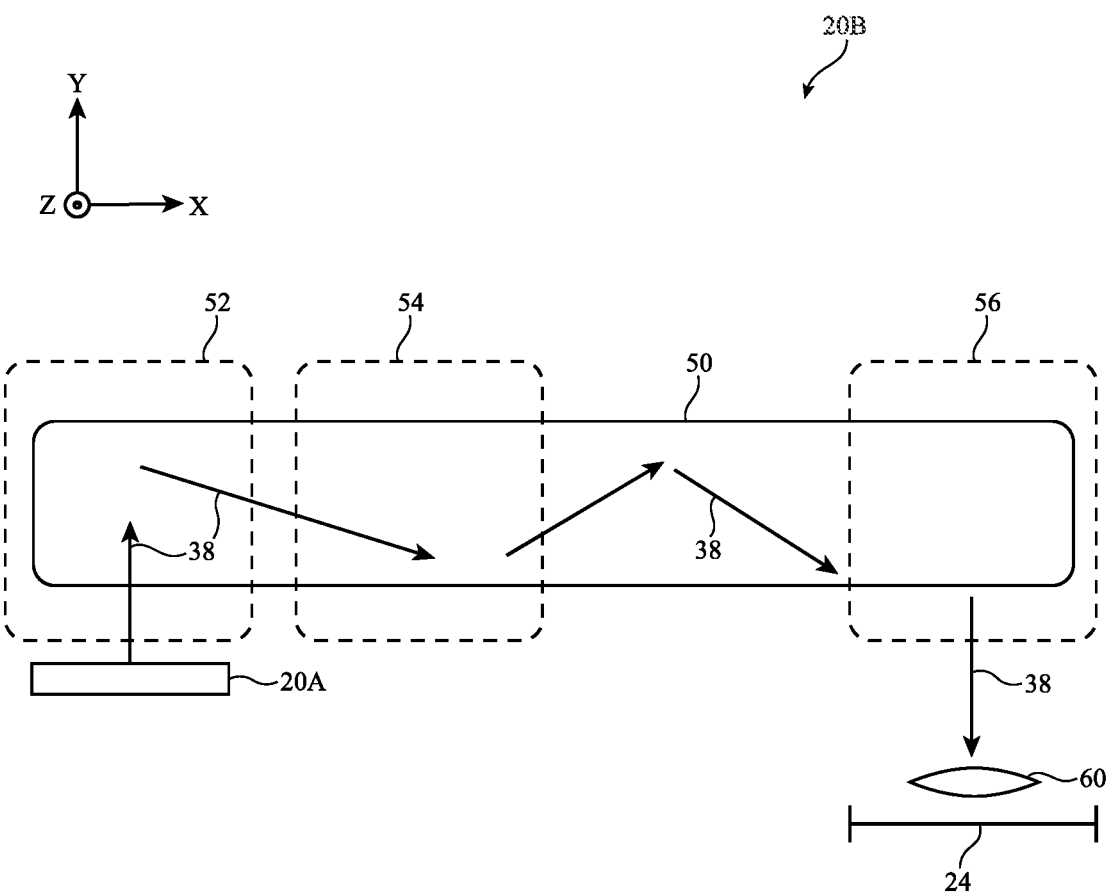
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, near-eye display 20 may include one or more display modules such as display module(s) 20A and an optical system such as optical system 20B. Optical system 20B may include optical elements such as one or more waveguides 50. Waveguide 50 may include one or more stacked substrates (e.g., stacked planar and/or curved layers sometimes referred to herein as waveguide substrates) of optically transparent material such as plastic, polymer, glass, etc.

If desired, waveguide 50 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 50 may include holographic phase gratings such as volume holograms or thin-film holograms, meta-gratings, or any other desired diffractive grating structures. The diffractive gratings on waveguide 50 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 50 if desired.

As shown in FIG. 2, display module 20A may generate image light 38 associated with image content to be displayed to eye box 24. Image light 38 may be collimated using a collimating lens if desired. Optical system 20B may be used to present image light 38 output from display module 20A to eye box 24. If desired, display module 20A may be mounted within support structure 8 of FIG. 1 while optical system 20B may be mounted between portions of support structure 8 (e.g., to form a lens that aligns with eye box 24). Other mounting arrangements may be used, if desired.

Optical system 20B may include one or more optical couplers (e.g., light redirecting elements) such as input coupler 52, cross-coupler 54, and output coupler 56. In the example of FIG. 2, input coupler 52, cross-coupler 54, and output coupler 56 are formed at or on waveguide 50. Input coupler 52, cross-coupler 54, and/or output coupler 56 may be completely embedded within the substrate layers of waveguide 50, may be partially embedded within the substrate layers of waveguide 50, may be mounted to waveguide 50 (e.g., mounted to an exterior surface of waveguide 50), etc.

Waveguide 50 may guide image light 38 down its length via total internal reflection. Input coupler 52 may be configured to couple image light 38 from display module 20A into waveguide 50, whereas output coupler 56 may be configured to couple image light 38 from within waveguide 50 to the exterior of waveguide 50 and towards eye box 24. Input coupler 52 may include an input coupling prism, an edge or face of waveguide 50, a lens, a steering mirror or liquid crystal steering element, or any other desired input coupling elements. As an example, display module 20A may emit image light 38 in the +Y direction towards optical system 20B. When image light 48 strikes input coupler 52, input coupler 52 may redirect image light 38 so that the light propagates within waveguide 50 via total internal reflection towards output coupler 56 (e.g., in the +X direction within the total internal reflection (TIR) range of waveguide 50). When image light 38 strikes output coupler 56, output coupler 56 may redirect image light 38 out of waveguide 50 towards eye box 24 (e.g., back along the Y-axis). A lens such as lens 60 may help to direct or focus image light 38 onto eye box 24. Lens 60 may be omitted if desired. In scenarios where cross-coupler 54 is formed on waveguide 50, cross-coupler 54 may redirect image light 38 in one or more directions as it propagates down the length of waveguide 50, for example. In redirecting image light 38, cross-coupler 54 may also perform pupil expansion on image light 38.

Input coupler 52, cross-coupler 54, and/or output coupler 56 may be based on reflective and refractive optics or may be based on diffractive (e.g., holographic) optics. In arrangements where couplers 52, 54, and 56 are formed from reflective and refractive optics, couplers 52, 54, and 56 may include one or more reflectors (e.g., an array of micromirrors, partial mirrors, louvered mirrors, or other reflectors). In arrangements where couplers 52, 54, and 56 are based on diffractive optics, couplers 52, 54, and 56 may include diffractive gratings (e.g., volume holograms, surface relief gratings, etc.).

The example of FIG. 2 is merely illustrative. Optical system 14B may include multiple waveguides that are laterally and/or vertically stacked with respect to each other. Each waveguide may include one, two, all, or none of couplers 52, 54, and 56. Waveguide 50 may be at least partially curved or bent if desired. One or more of couplers 52, 54, and 56 may be omitted. If desired, optical system 20B may include an optical coupler such as a surface relief grating structure that performs the operations of both cross-coupler 54 and output coupler 56. For example, the surface relief grating structure may redirect image light 38 as the image propagates down waveguide 50 (e.g., while expanding the image light) and the surface relief grating structure may also couple image light 38 out of waveguide 50 and towards eye box 24.

Figure 3A:
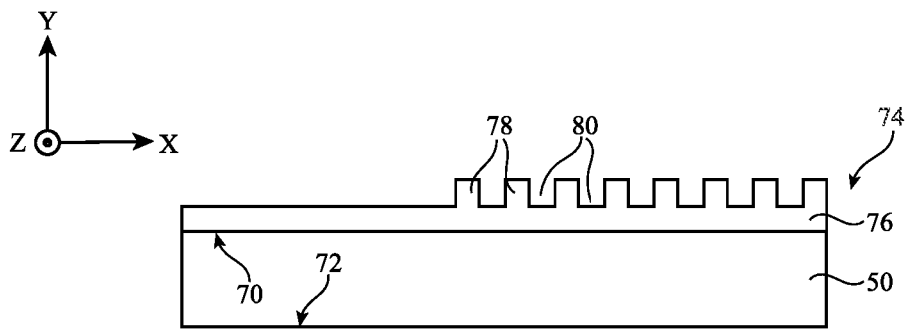
FIGS. 3A-3C are top views of illustrative waveguides provided with a surface relief grating structure in accordance with some embodiments.

FIG. 3A is a top view showing one example of how a surface relief grating structure may be formed on waveguide 50. As shown in FIG. 3A, waveguide 50 may have a first lateral (e.g., exterior) surface 70 and a second lateral surface 72 opposite lateral surface 70. Waveguide 50 may include any desired number of one or more stacked waveguide substrates. If desired, waveguide 50 may also include a layer of grating medium sandwiched (interposed) between first and second waveguide substrates (e.g., where the first waveguide substrate includes lateral surface 70 and the second waveguide substrate includes lateral surface 72).

Waveguide 50 may be provided with a surface relief grating structure such as surface relief grating structure 74. Surface relief grating (SRG) structure 74 may be formed within a substrate such as a layer of SRG substrate (medium) 76. In the example of FIG. 3A, SRG substrate 76 is layered onto lateral surface 70 of waveguide 50. This is merely illustrative and, if desired, SRG substrate 76 may be layered onto lateral surface 72 (e.g., the surface of waveguide 50 that faces the eye box).

SRG structure 74 may include at least two partially-overlapping surface relief gratings. Each surface relief grating in SRG structure 74 may be defined by corresponding ridges (peaks) 78 and troughs (minima) 80 in the thickness of SRG substrate 76. In the example of FIG. 3A, SRG structure 74 is illustrated for the sake of clarity as a binary structure in which the surface relief gratings in SRG structure 74 are defined either by a first thickness associated with peaks 78 or a second thickness associated with troughs 80. This is merely illustrative. If desired, SRG structure 74 may be non-binary (e.g., may include any desired number of thicknesses following any desired profile, may include peaks 78 that are angled at non-parallel fringe angles with respect to the Y axis, etc.). If desired, SRG substrate 76 may be adhered to lateral surface 70 of waveguide 50 using a layer of adhesive (not shown). SRG structure 74 may be fabricated separately from waveguide 50 and may be adhered to waveguide 50 after fabrication, for example. As another example, ridges 78 may be patterned to substrate 50 without an intervening SRG substrate 76.

Figure 3B:
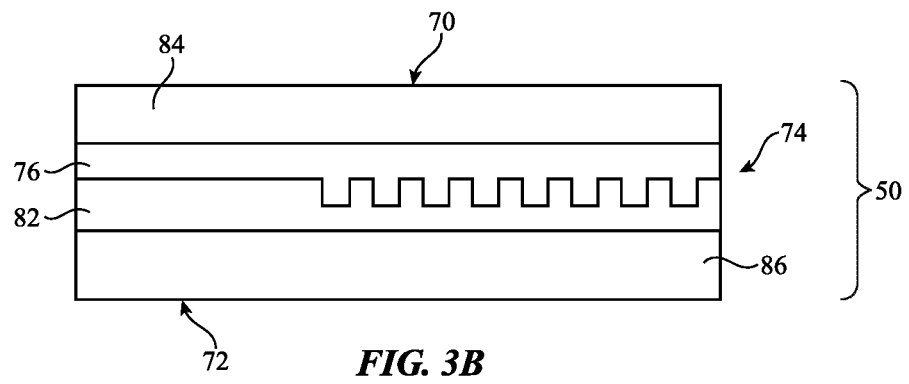

The example of FIG. 3A is merely illustrative. In another implementation, SRG structure 74 may be placed at a location within the interior of waveguide 50, as shown in the example of FIG. 3B. As shown in FIG. 3B, waveguide 50 may include a first waveguide substrate 84, a second waveguide substrate 86, and a media layer 82 interposed between waveguide substrate 84 and waveguide substrate 86. Media layer 82 may be a grating or holographic recording medium, a layer of adhesive, a polymer layer, a layer of waveguide substrate, or any other desired layer within waveguide 50. SRG substrate 76 may be layered onto the surface of waveguide substrate 84 that faces waveguide substrate 86. Alternatively, SRG substrate 76 may be layered onto the surface of waveguide substrate 86 that faces waveguide substrate 84.

Figure 3C:
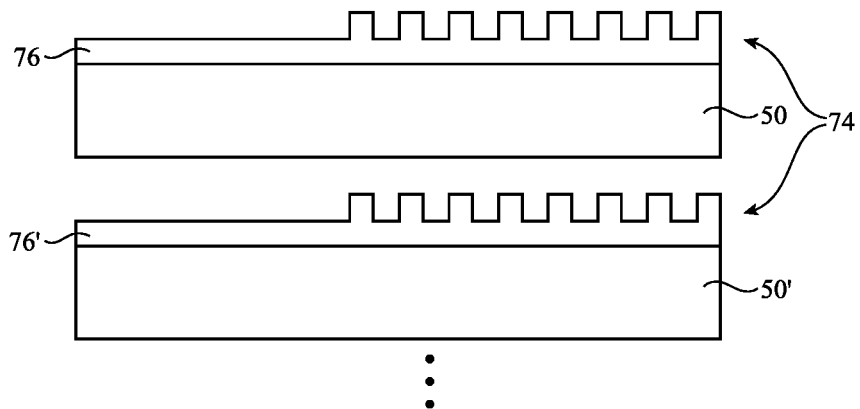

If desired, SRG structure 74 may be distributed across multiple layers of SRG substrate, as shown in the example of FIG. 3C. As shown in FIG. 3C, the optical system may include multiple stacked waveguides such as at least a first waveguide 50 and a second waveguide 50'. A first SRG substrate 76 may be layered onto one of the lateral surfaces of waveguide 50 whereas a second SRG substrate 76' is layered onto one of the lateral surfaces of waveguide 50'. First SRG substrate 76 may include one or more of the surface relief gratings in SRG structure 74. Second SRG substrate 76' may include one or more of the surface relief gratings in SRG structure 74. This example is merely illustrative. If desired, the optical system may include more than two stacked waveguides. In examples where the optical system includes more than two waveguides, each waveguide that is provided with an SRG substrate may include one or more of the surface relief gratings in SRG structure 74. While described herein as separate waveguides, waveguides 50 and 50' of FIG. 3C may also be formed from respective waveguide substrates of the same waveguide, if desired. The arrangements in FIGS. 3A, 3B, and/or 3C may be combined if desired.

If desired, multiple surface relief gratings may be co-located for redirecting (expanding) image light 38 in different directions (e.g., in an overlapping or interleaved arrangement in or on waveguide 50). The surface relief gratings in SRG structure 74 may overlap in physical space (e.g., when viewed in the −Y direction of FIGS. 3A-3C) and, in implementations where only a single SRG substrate 76 is used, may each at least partially overlap within the same volume of SRG substrate 76. Despite overlapping on waveguide 50, the surface relief gratings in SRG structure 74 may diffract incoming light from and/or onto different respective directions.

There are numerous possible ways to produce SRG structures. One method is to use nanoimprinting. In nanoimprinting, a high-index resin may be formed on a substrate. A nanoimprinting mold is pressed into the high-index resin to produce ridges and troughs that define the surface relief grating. Nanoimprinting may have a relatively low associated manufacturing cost and high manufacturing throughput. However, the high-index resin used during the nanoimprinting process may have a limited index of refraction. In other words, it would be desirable to use a material having a higher index of refraction for the nanoimprinting process.

Another method to produce SRG structures is to use etching. In an etching process, a hard mask may be formed over a high-index material such as titanium dioxide. The material (e.g., titanium dioxide) is then etched through the hard mask to create ridges and troughs that define the surface relief grating. The etching process may be relatively expensive and take a relative long amount of time (e.g., low throughput). Additionally, controlling the angle of the sidewall profile for the surface relief grating may be difficult using an etching process.

Figure 4:
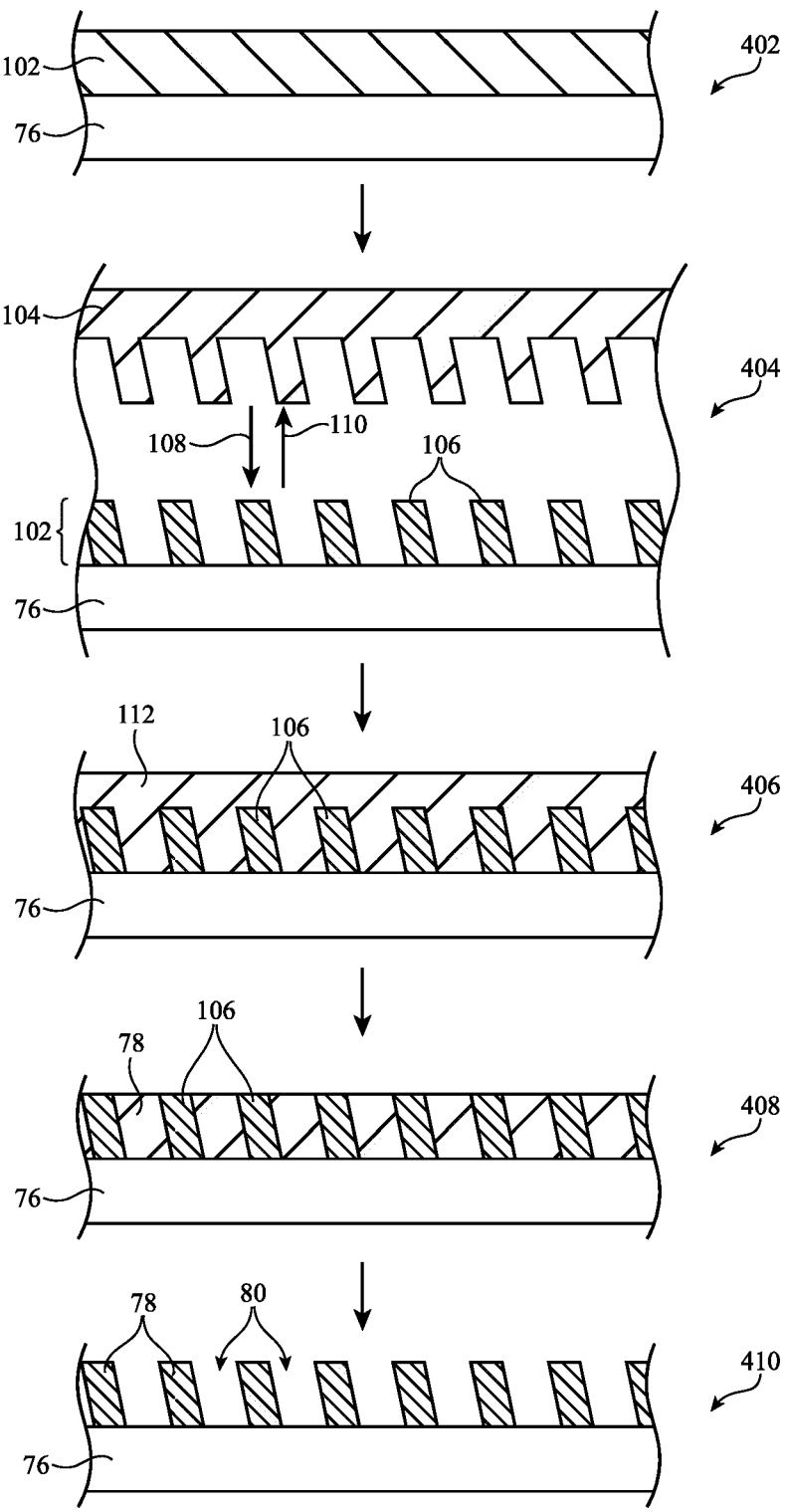
FIG. 4 is a diagram of illustrative method steps for forming surface relief grating structures including nanoimprinting a low-index material in accordance with some embodiments.

FIG. 4 is a diagram of illustrative method steps for forming SRG structures. In the method of FIG. 4, nanoimprinting is used to form a mold. A high-index material is then conformably deposited over the mold. The mold may subsequently be removed to leave just the high-index gratings.

At step 402, a nanoimprinting resin 102 is formed over substrate 76. Nanoimprinting resin 102 (sometimes referred to as low-index resin 102 or resin 102) may be a sacrificial layer that is removed from the SRG structure later during manufacturing. The nanoimprinting resin 102 may have properties optimized for the nanoimprinting process. The index of refraction of resin 102 is not critical for the performance of the SRG structure. Therefore, the index of refraction of resin 102 may be relatively low (e.g., less than 2, less than 1.9, less than 1.8, less than 1.7, less than 1.6, less than 1.5, less than 1.4, etc.).

At step 404, a nanoimprinting mold 104 is applied to resin 102. The nanoimprinting mold 104 may be moved in direction 108 (e.g., to stamp the resin) then in direction 110 (e.g., removed from the resin). Resin 102 may be exposed to a specific type of light (e.g., ultraviolet light) to cure the resin in the shape imparted by mold 104, may be cooled to keep the resin in the shape imparted by mold 104, etc.

Nanoimprinting mold 104 has surface features with ridges and troughs that match the shape of the surface relief grating that is ultimately formed using the method of FIG. 4. As shown in FIG. 4, at step 404, after nanoimprinting is completed, resin layer 102 may have remaining ridge structures 106 present on substrate 76. The remaining ridge structures 106 form a mold for the subsequent deposition step 406.

At step 406, a high-index material is deposited over the low-index ridge structures 106 and substrate 76. This deposition step may be performed using chemical vapor deposition (CVD), atomic layer deposition (ALD), high density plasma chemical vapor deposition (HDPCVP), physical vapor deposition (PVD), spin coating, or another desired technique. Material 112 may be titanium dioxide or another desired high-index material. The index of refraction of material 112 in step 406 is higher than the index of refraction of material 102 from step 402 (e.g., by greater than 0.1, greater than 0.3, greater than 0.5, greater than 0.7, greater than 1, etc.). The index of refraction of material 112 in step 406 may be greater than 1.5, greater than 1.8, greater than 2.0, greater than 2.2, greater than 2.4, greater than 2.5, etc. As shown, high-index material 112 conforms to the ridge structures 106 on substrate 76.

Next, at step 408, excess high-index material 112 may be removed such that the high-index material does not extend past the upper surface of ridge structures 106. As shown, a planar upper surface is formed that alternates between the mold (low-index) ridge structures 106 and high-index ridge structures 78 (sometimes referred to as grating structures 78) that define the surface relief grating. The excess high-index material 112 may be removed using etching and/or chemical mechanical polishing (CMP).

At step 410, the low-index ridge structures 106 may be removed (e.g., using dry or wet etching). After this removal, only grating structures 78 remain on substrate 76. As shown, the surface relief grating includes air-filled troughs 80 in the space where low-index ridge structures 106 used to be present.

In FIG. 4, the sidewalls of ridge structures 78 are at a non-orthogonal angle relative to the upper surface of substrate 76. This example is merely illustrative. In general, the ridge structures may be selected to have any desired shape, spacing, dimensions, etc.

With the method of FIG. 4, the benefits of nanoimprinting (e.g., low cost, high throughput, precise ridge sidewall control, etc.) are present while still using a high-index material to form the grating structures.

It should be noted that, if desired, step 410 of FIG. 4 may optionally be omitted. The structure produced at step 408 (with alternating structures 78 and 106 having a planar upper surface) may be used as a SRG structure in an optical system. Because the SRG structure in step 408 has a planar upper surface, an anti-reflective coating (or other desired coating) may be easily applied to the structure.

Figure 5:
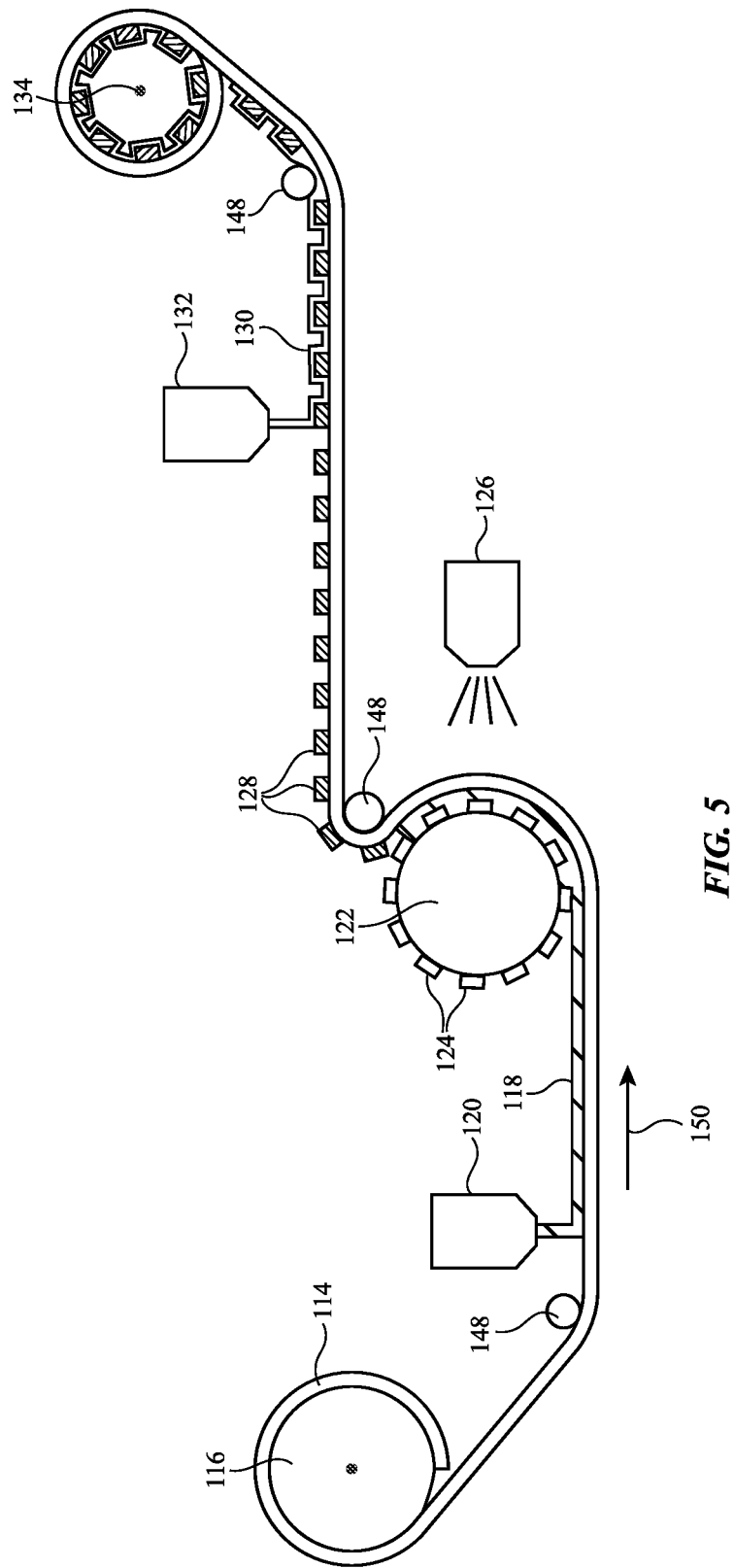
FIG. 5 is a cross-sectional side view of a system for producing a reusable working mold that is used to subsequently produce surface relief grating structures in accordance with some embodiments.
Figure 6:
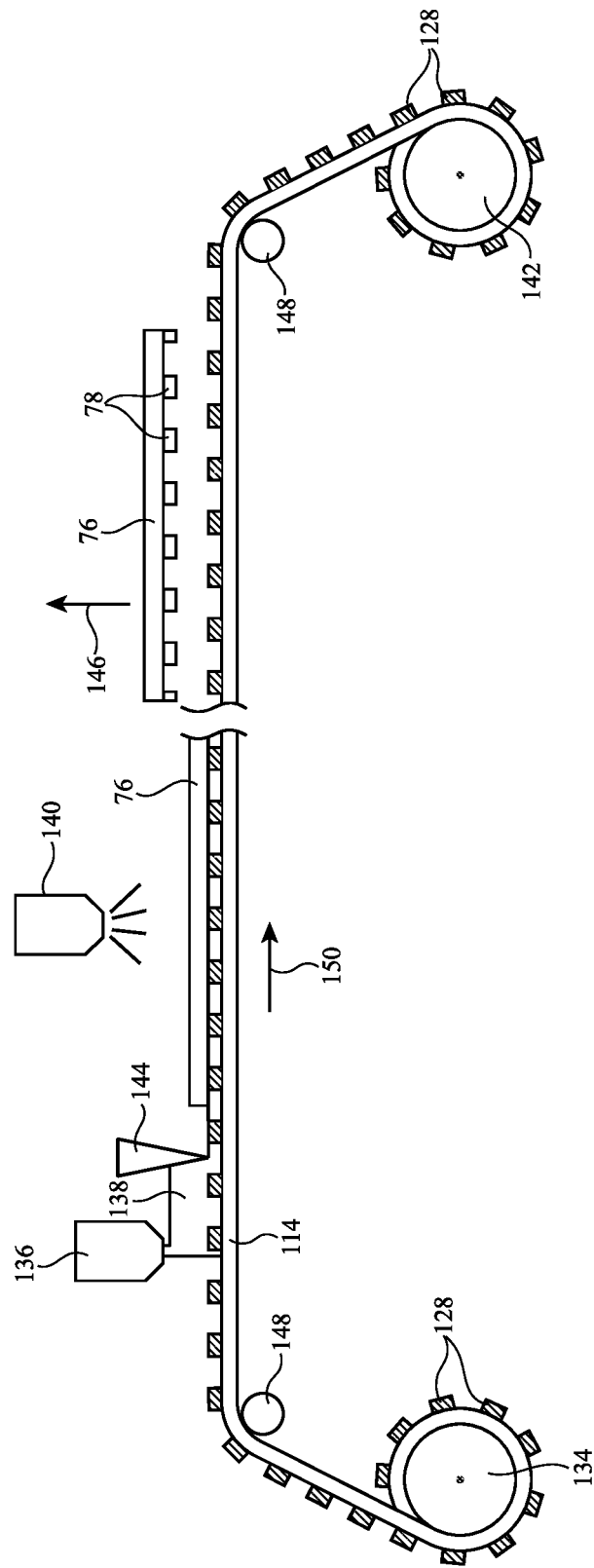
FIG. 6 is a cross-sectional side view of a system for using a reusable working mold (such as the mold from FIG. 5) to produce surface relief grating structures in accordance with some embodiments.

FIGS. 5 and 6 show another method for manufacturing SRG structures. FIG. 5 is a cross-sectional side view of a system for producing a reusable working mold on a plastic substrate. FIG. 6 is a cross-sectional side view of a system for using the reusable working mold to produce SRG structures.

As shown in FIG. 5, a substrate 114 may be wrapped around a roller 116. Substrate 114 may be formed from a flexible material such as plastic. Roller 116 may be rotated to unwind the plastic substrate from the roller. As the plastic substrate 114 is unwound, a low-index material 118 (sometimes referred to as low-index resin 118, resin 118, or nanoimprinting resin 118) may be dispensed on the substrate by dispenser 120. Low-index resin 118 may be a sacrificial layer that is removed from the SRG structure later during manufacturing. The resin 118 may have properties optimized for the subsequent nanoimprinting process. The index of refraction of resin 118 is not critical for the performance of the SRG structure. Therefore, the index of refraction of resin 118 may be relatively low (e.g., less than 2, less than 1.9, less than 1.8, less than 1.7, less than 1.6, less than 1.5, less than 1.4, etc.).

Resin 118 may initially be formed in a blanket layer having a uniform thickness on substrate 114. Resin 118 may be deposited using any desired dispenser 120. After being applied to substrate 114, the resin 118 may undergo a nanoimprinting process. As shown, a nanoimprinting mold 122 is applied to resin 118. The nanoimprinting mold 122 may rotate while stamping the resin 118. Nanoimprinting mold 122 has surface features with ridges 124 and troughs that match the shape of the surface relief grating that is ultimately formed using the method of FIGS. 5 and 6.

While mold 122 contacts resin layer 118 (imparting desired surface features into the resin), the resin may be exposed to light from light source 126. The light from light source 126 cures the resin to ensure the resin maintains the molded shape imparted by surface features 124 on mold 122. Light source 126 may emit ultraviolet light, light at another desired wavelength (e.g., visible light), or any other desired type of electromagnetic wave that cures resin 118.

After nanoimprinting is completed, resin layer 118 may have remaining ridge structures 128 present on substrate 114. The remaining ridge structures 128 form a mold for subsequent processing shown in FIG. 6. If desired, an anti-stick coating 130 may be formed over ridge structures 128 using dispenser 132. Anti-stick coating 130 may prevent ridge structures 128 from sticking to high-index material during subsequent manufacturing steps. The anti-stick coating may be applied as a blanket layer having uniform thickness, as one example. Dispenser 132 for applying the anti-stick coating may use atomic layer deposition (ALD), sputtering, spin coating, or any other desired technique for applying the coating. After the anti-stick coating is applied, the substrate 114 with ridge structures 128 may be wound on roller 134. In other words roller 134 may rotate to wind substrate 114 onto the roller.

Throughout operation of the system of FIG. 5, substrate 114 may move in direction 150. Substrate 114 may move in direction 150 at a constant rate or at a variable rate. Rollers 116 and 134 as well as one or more additional rollers 148 may be used to move the substrate in the desired manner.

The system of FIG. 6 uses the roller with the reusable working mold from FIG. 5 (e.g., substrate 114 with ridge structures 128) to produce SRG structures. As shown in FIG. 6, substrate 114 and patterned ridge structures 128 (e.g., the reusable working mold) may be wound on roller 134. The reusable working mold may be wound on the same physical roller as in the end of the system of FIG. 5 or a different roller than at the end of the system of FIG. 5.

Roller 134 may be rotated to unwind the substrate 114 with ridge structures 128. As the plastic substrate 114 is unwound, a high-index material 138 is deposited over the low-index ridge structures 128 and substrate 114 by dispenser 136. Dispenser 136 may deposit high-index material 138 using chemical vapor deposition (CVD), atomic layer deposition (ALD), high density plasma chemical vapor deposition (HDPCVP), physical vapor deposition (PVD), spin coating, or another desired technique. Material 138 may be titanium dioxide or another desired high-index material. The index of refraction of material 138 is higher than the index of refraction of material 118 (and patterned ridge structures 128) (e.g., by greater than 0.1, greater than 0.3, greater than 0.5, greater than 0.7, greater than 1, etc.). The index of refraction of material 138 may be greater than 1.5, greater than 1.8, greater than 2.0, greater than 2.2, greater than 2.4, greater than 2.5, etc. As shown, high-index material 138 conforms to the ridge structures 128 on substrate 114.

When initially deposited, high-index material 138 may have excess material (e.g., having a uniform or non-uniform thickness). The system of FIG. 6 therefore includes a leveling structure 144 to cut the high-index material to a desired thickness level with a smooth planar upper surface. Leveling structure 144 shaves excess material off the top of high-index layer 138 to provide a planar upper surface.

Next, a SRG substrate 76 (e.g., formed from glass or another desired material) is placed on an upper surface of the high-index material 138. While substrate 76 is present on the high-index material, a light source 140 emits light to cure the high-index material 138. Light source 140 may emit ultraviolet light, light at another desired wavelength (e.g., visible light), or any other desired type of electromagnetic wave that cures resin 138.

Once the high-index material is cured, substrate 76 may be removed by moving the substrate in direction 146. One or more computer-controller positioners may be used to place substrate 76 adjacent to high-index material 138 and subsequently remove substrate 76 (in direction 146). After being removed, high-index ridge structures 78 (e.g., grating structures) are present on substrate 76. Substrate 76 and ridge structures 78 may subsequently be used as a surface relief grating for an optical system.

The anti-stick coating 130 on ridge structures 128 (shown in FIG. 5) may help ensure that high-index ridge structures 78 to do not stick to low-index ridge structures 128 during the removal process. For simplicity of the drawing, anti-stick coating 130 is not explicitly shown in FIG. 6. However, it should be noted that, in FIG. 6, the anti-stick coating is present in a blanket layer over ridge structures 128 and substrate 114 (as shown in FIG. 5).

After the substrate 76 is removed, substrate 114 with ridge structures 128 (e.g., the reusable working mold) may be wound around roller 142. The reusable working mold may then be used again for the same process. In other words, after the reusable working mold is produced once (as in FIG. 5), it may be used repeatedly to produce SRG structures (as in FIG. 6).

It should be noted that the methods of FIGS. 5 and 6 may be performed at a wafer level. In other words, the dimensions of substrate 114 and substrate 76 may be relatively large. Substrate 114 (e.g., the reusable working mold) may have a width that is greater than 10 centimeters, greater than 30 centimeters, greater than 50 centimeters, greater than 100 centimeters, greater than 130 centimeters, between 10 centimeters and 150 centimeters, etc. Substrate 114 may have a length (e.g., the dimension that is wound about the rollers) that is greater than 50 centimeters, greater than 100 centimeters, greater than 500 centimeters, greater than 1000 centimeters, etc.

Similarly, substrate 76 that is applied to the high-index material as in FIG. 6 may be a wafer-level substrate.

Substrate 76 may have a width that is greater than 10 centimeters, greater than 30 centimeters, greater than 50 centimeters, greater than 100 centimeters, greater than 130 centimeters, between 10 centimeters and 150 centimeters, etc. Substrate 76 may have a length that is greater than 10 centimeters, greater than 30 centimeters, greater than 50 centimeters, greater than 100 centimeters, greater than 130 centimeters, between 10 centimeters and 150 centimeters, etc. After the SRG wafer is produced in FIG. 6, substrate 76 may be diced into smaller SRG structures that are used in electronic devices. Once diced and incorporated into device 10, SRG substrate 76 may have a width and length that are each less than 10 centimeters, less than 6 centimeters, less than 4 centimeters, less than 3 centimeters, less than 2 centimeters, etc.

Throughout operation of the system of FIG. 6, substrate 114 may move in direction 150. Substrate 114 may move in direction 150 at a constant rate or at a variable rate. Rollers 134 and 142 as well as one or more additional rollers 148 may be used to move the substrate in the desired manner.

In some applications, it may be desirable for a SRG structure to have a varying diffractive efficiency across the SRG structure. Take an example where an SRG structure has a left edge and a right edge and light is incident upon the SRG structure at the left edge (and thereafter moves from left to right across the SRG structure). The diffraction efficiency may increase from left to right across the SRG structure. This type of arrangement may serve to prevent the SRG structure from diffracting an excessive amount of image light 38 out of waveguide 50 when the light first enters the SRG structure (and therefore has a high brightness). As light exits the waveguide, the brightness of the light remaining in the waveguide decreases. Increasing the diffraction efficiency from left to right across the SRG structure allows more light to exit the waveguide as the brightness decreases, keeping a uniform brightness for light exiting the waveguide across the SRG structure.

To form a SRG structure having varying diffractive efficiency, it may be desirable for the SRG structure to include ridges/troughs having varying heights (e.g., depth modulation). To achieve depth modulation of this type, it may be desirable to pattern a sloped surface in a material. There are numerous possible techniques for forming a sloped surface. FIGS. 7A-7E show illustrative techniques for forming a sloped surface.

Figure 7A:
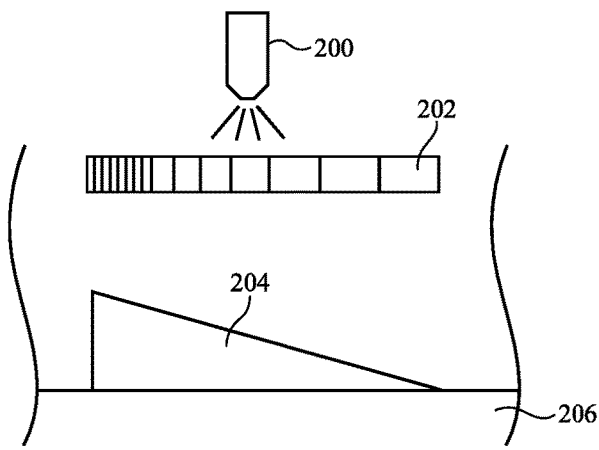
FIG. 7A is a side view showing a system for producing a sloped surface on a substrate using gray-scale photolithography in accordance with some embodiments.

FIG. 7A is a cross-sectional side view of a gray-scale photolithography technique. As shown, a light source 200 may shine light (at any desired wavelength) through a gray-scaled patterned optical mask 202. Patterned optical mask 202 may have a transmission that varies across the mask to control the amount of light that passes to the underlying photoresist material 204. Due to the varying amount of light received by photoresist material 204, the photoresist material 204 (which is formed on an underlying substrate 206) has a sloped surface after patterning.

Figure 7B:
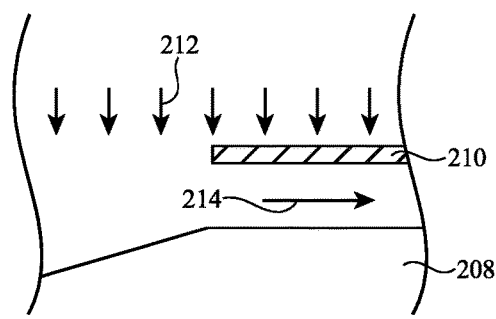
FIG. 7B is a side view showing a system for producing a sloped surface on a substrate using etching and a sliding mask in accordance with some embodiments.

FIG. 7B is a cross-sectional side view of an etching technique that uses a sliding mask. As shown in FIG. 7B, a substrate 208 is etched by etching ions 212. A mask 210 is included in the system that blocks ions 212. Mask 210 is moved in direction 214 to expose the underlying substrate 208 to ions 212. This produces a sloped surface in substrate 208.

Figure 7C:
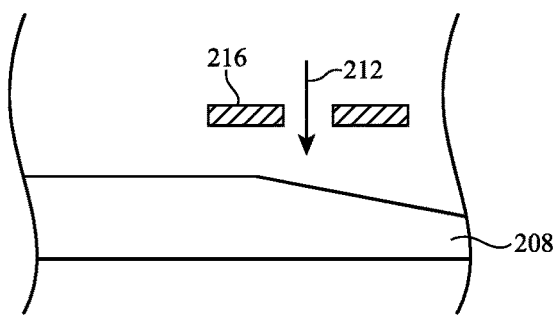
FIG. 7C is a side view showing a system for producing a sloped surface on a substrate using etching and a scanning slit in accordance with some embodiments.

FIG. 7C is a cross-sectional side view of an etching technique that uses a scanning slit. As shown in FIG. 7C, a substrate 208 is etched by etching ions 212. A mask 216 is included in the system that blocks ions 212. Mask 216 has an opening (slit) that allows ions 212 to pass through the mask. Mask 216 is moved laterally while simultaneously changing the beam power of ion beam 212. This produces a sloped surface in substrate 208.

Figure 7D:
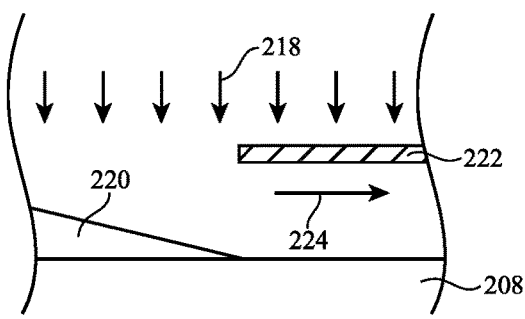
FIG. 7D is a side view showing a system for producing a sloped surface on a substrate using coating and a sliding mask in accordance with some embodiments.

FIG. 7D is a cross-sectional side view of a coating technique that uses a sliding mask. As shown in FIG. 7D, a substrate 208 is coated with coating material 218 to form a sloped layer 220. A mask 222 is included in the system that blocks coating material 218. Mask 222 is moved in direction 224 to expose the underlying substrate 208 to coating material 218. This produces a sloped layer 220.

Figure 7E:
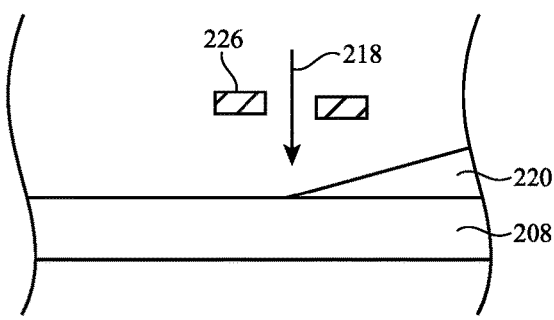
FIG. 7E is a side view showing a system for producing a sloped surface on a substrate using coating and a scanning slit in accordance with some embodiments.

FIG. 7E is a cross-sectional side view of a coating technique that uses a scanning slit. As shown in FIG. 7E, a substrate 208 is coated with coating material 218 to form a sloped layer 220. A mask 226 is included in the system that blocks coating material 218. Mask 226 has an opening (slit) that allows coating material 218 to pass through the mask. Mask 226 is moved laterally while simultaneously changing the coating rate of coating material 218. This produces a sloped layer 220 on substrate 208.

One or more of these techniques for forming a sloped layer may be used when forming depth-modulated SRG structures.

FIGS. 8-12 are diagrams of various methods for forming SRG structures with depth modulation. At step 802, a high-index layer 152 may be formed over SRG substrate 76. Substrate 76 may be formed from glass or another desired material. This deposition step may be performed using chemical vapor deposition (CVD), atomic layer deposition (ALD), high density plasma chemical vapor deposition (HDPCVP), physical vapor deposition (PVD), spin coating, or another desired technique. Material 152 may be titanium dioxide or another desired high-index material. The index of refraction of material 152 in step 802 may be greater than 1.5, greater than 1.8, greater than 2.0, greater than 2.2, greater than 2.4, greater than 2.5, etc.

Next, at step 804, a hard mask 154 is formed over high-index layer 152. Hard mask 154 may be patterned to cover the footprint of the ridges for the SRG structure. Hard mask 154 may be formed using photolithography, nanoimprinting, electron beam lithography, or any other desired technique.

At step 806, a soft mask coating 156 with a sloped surface is formed over the hard mask 154. Soft mask coating may be formed from a material having any desired refractive index. Soft mask coating will ultimately be removed from the final SRG structure, so the index of refraction of coating 156 does not impact the optical properties of the SRG structure. The sloped soft mask coating 156 may be formed using any of the techniques of FIGS. 7A-7E. In other words, the soft mask coating may be patterned using gray-scale photolithography (as in FIG. 7A), formed as a uniform layer then etched to have a slope (as in FIG. 7B or FIG. 7C), or coated with a sloped top surface (as in FIG. 7D or FIG. 7E).

Next, at step 808, an etching step may remove soft mask 156 and form trenches (troughs) 80 in high-index material 152. The remaining portions of material 152 define high-index ridges 78 for the SRG structure. The etching step in step 808 may have a low selectivity to soft mask 156, meaning that soft mask 156 and high-index material 152 etch at similar rates. Therefore, on the left side of the structure, where coating 156 is thickest, etching all of coating 156 will take a longer time and there is less time for the etching of high-index material 152. This results in a shallower trough on the left side of the structure. On the right side of the structure, where coating 156 is thinnest, all of coating 156 is quickly removed and the etching mainly removes high-index material 152. This results in a deeper trough on the right side of the structure.

At step 810, hard mask 154 is removed, leaving a depth-modulated SRG structure that may be used in the optical system 20B of device 10. As shown in step 810 of FIG. 8, the SRG structure has ridges 78 that each have an upper surface that is the same distance 158 from the upper surface of substrate 76. In other words, the upper surfaces of each ridge 78 are coplanar with a plane that is parallel to the upper surface of substrate 76. The depth of troughs 80 gradually changes across the SRG structure to achieve the desired depth modulation.

Figure 8:
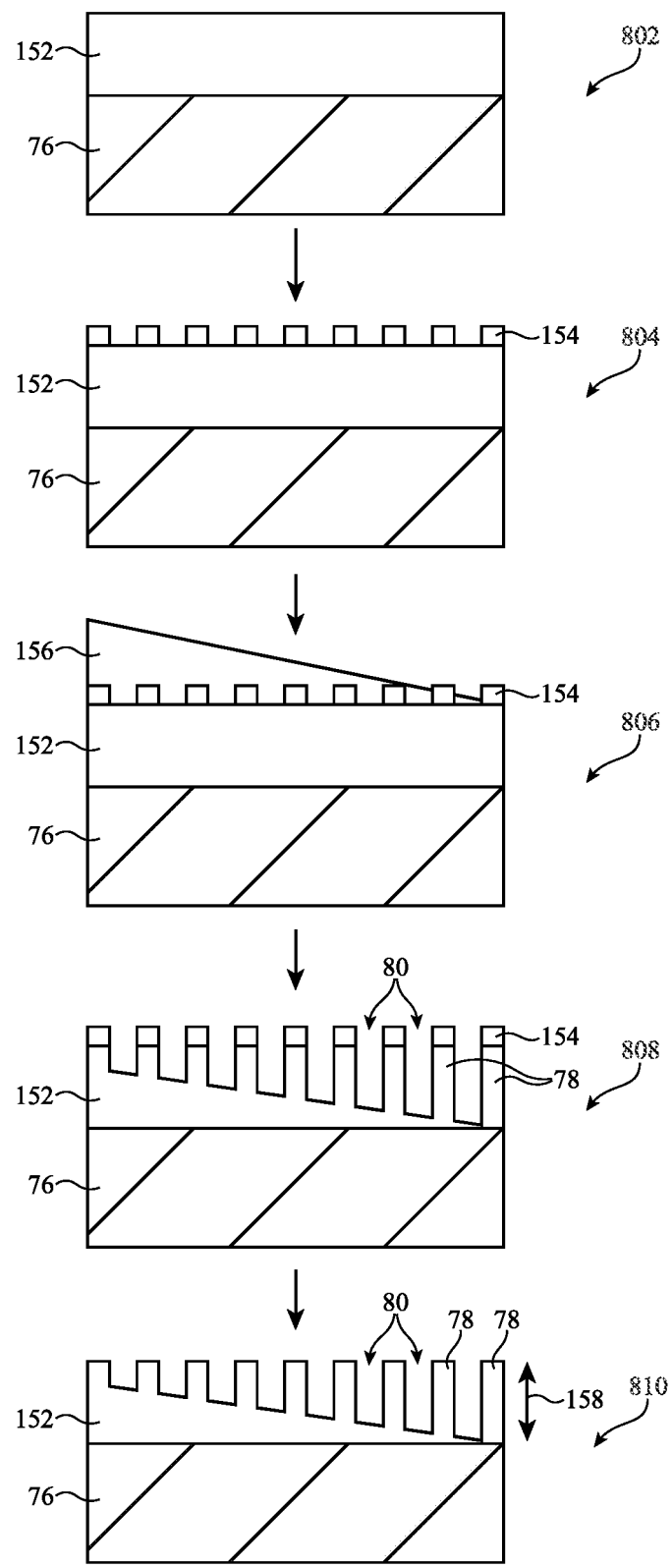
FIG. 8 is a diagram of illustrative method steps for forming depth-modulated surface relief grating structures having ridges with varying trough depths on a planar substrate including using a soft mask in accordance with some embodiments.
Figure 9:
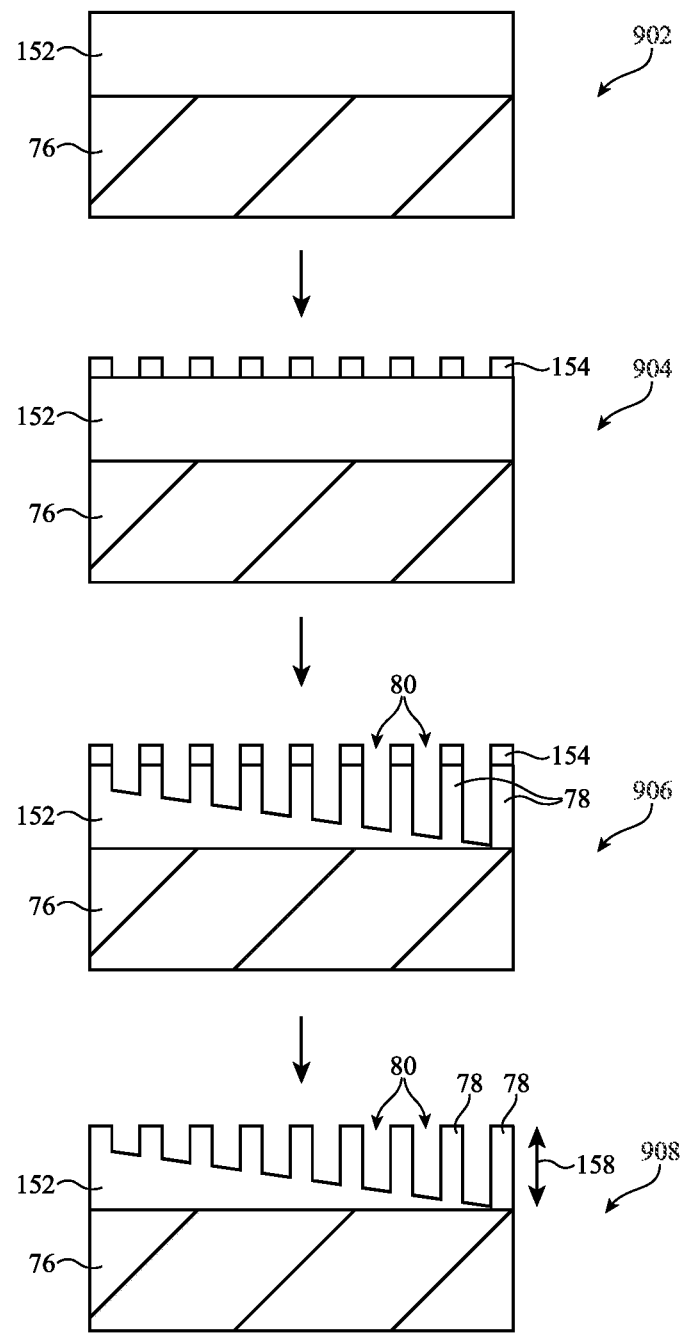
FIG. 9 is a diagram of illustrative method steps for forming depth-modulated surface relief grating structures having ridges with varying trough depths on a planar substrate including a sloped etching step in accordance with some embodiments.

FIG. 9 is a diagram of a method for forming SRG structures with depth modulation without coating 156 of FIG. 8. First, at step 902, a high-index layer 152 may be formed over SRG substrate 76. Substrate 76 may be formed from glass or another desired material. This deposition step may be performed using chemical vapor deposition (CVD), atomic layer deposition (ALD), high density plasma chemical vapor deposition (HDPCVP), physical vapor deposition (PVD), spin coating, or another desired technique. Material 152 may be titanium dioxide or another desired high-index material. The index of refraction of material 152 in step 902 may be greater than 1.5, greater than 1.8, greater than 2.0, greater than 2.2, greater than 2.4, greater than 2.5, etc.

Next, at step 904, a hard mask 154 is formed over high-index layer 152. Hard mask 154 may be patterned to cover the footprint of the ridges for the SRG structure. Hard mask 154 may be formed using photolithography, nanoimprinting, electron beam lithography, or any other desired technique.

At step 906, a sloped etching step may be performed (e.g., using one of the techniques of FIG. 7B or FIG. 7C). With the presence of additional hard mask 154, a sloped surface is produced in high-index material 152 that is interrupted by ridges 78 under hard mask 154.

At step 908, hard mask 154 is removed, leaving a depth-modulated SRG structure that may be used in the optical system 20B of device 10. As shown in step 908 of FIG. 9, the SRG structure has ridges 78 that each have an upper surface that is the same distance 158 from the upper surface of substrate 76. In other words, the upper surfaces of each ridge 78 are coplanar with a plane that is parallel to the upper surface of substrate 76. The depth of troughs 80 gradually changes across the SRG structure (as a result of the sloped etch in step 906) to achieve the desired depth modulation.

Figure 10:
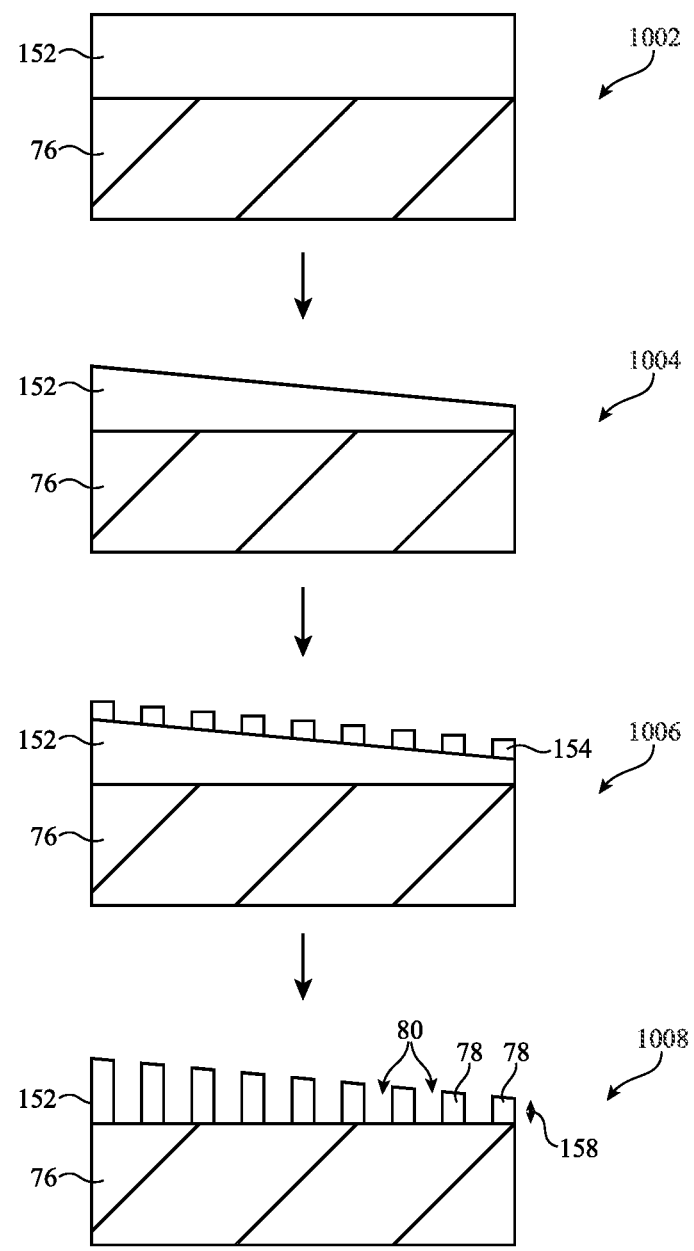
FIG. 10 is a diagram of illustrative method steps for forming depth-modulated surface relief grating structures having ridges with varying heights on a planar substrate including a sloped etching step through a hard mask in accordance with some embodiments.

FIG. 10 is a diagram of another method for forming SRG structures with depth modulation. First, at step 1002, a high-index layer 152 may be formed over SRG substrate 76. Substrate 76 may be formed from glass or another desired material. This deposition step may be performed using chemical vapor deposition (CVD), atomic layer deposition (ALD), high density plasma chemical vapor deposition (HDPCVP), physical vapor deposition (PVD), spin coating, or another desired technique. Material 152 may be titanium dioxide or another desired high-index material. The index of refraction of material 152 in step 1002 may be greater than 1.5, greater than 1.8, greater than 2.0, greater than 2.2, greater than 2.4, greater than 2.5, etc.

At step 1004, a sloped etching step may be performed (e.g., using one of the techniques of FIG. 7B or FIG. 7C). This causes high-index material 152 to have a sloped upper surface as shown in step 1004 of FIG. 10.

The example in steps 1002 and 1004 of forming a high-index layer with a uniform thickness then etching the high-index layer to have a sloped upper surface is merely illustrative. If desired, one of the techniques of FIG. 7A, 7D, or 7E may instead be used to form a high-index layer having a sloped upper surface.

Next, at step 1006, a hard mask 154 is formed over high-index layer 152. Hard mask 154 may be patterned to cover the footprint of the ridges for the SRG structure. Hard mask 154 may be formed using photolithography, nanoimprinting, electron beam lithography, or any other desired technique.

At step 1008, an etching step is performed to remove the entire thickness of high-index layer 152 that is not covered by hard mask 154. This defines troughs 80 in the high-index layer that extend from the sloped surface of the high-index layer to the upper surface of substrate 76. The hard mask is subsequently removed, leaving a depth-modulated SRG structure that may be used in the optical system 20B of device 10. As shown in step 1008 of FIG. 10, the SRG structure has ridges 78 that have a varying thickness 158 across the surface of substrate 76. A plane at a non-zero angle relative to the upper surface of substrate 76 may be coplanar with the upper surface of depth-modulated ridges 78 in FIG. 10.

Figure 11:
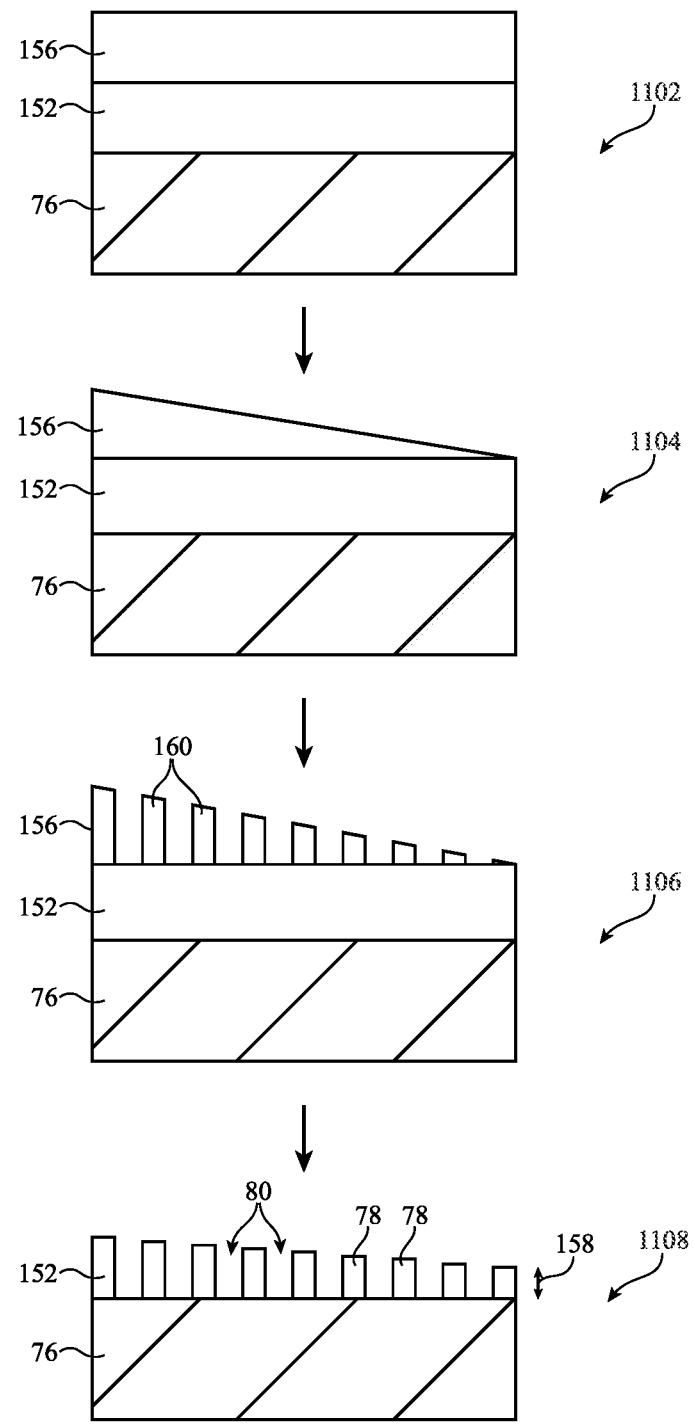
FIG. 11 is a diagram of illustrative method steps for forming depth-modulated surface relief grating structures having ridges with varying heights on a planar substrate including an initial sloped etching step in accordance with some embodiments.

FIG. 11 is a diagram of another method for forming SRG structures with depth modulation. First, at step 1102, a high-index layer 152 may be formed over SRG substrate 76. Substrate 76 may be formed from glass or another desired material. This deposition step may be performed using chemical vapor deposition (CVD), atomic layer deposition (ALD), high density plasma chemical vapor deposition (HDPCVP), physical vapor deposition (PVD), spin coating, or another desired technique. Material 152 may be titanium dioxide or another desired high-index material. The index of refraction of material 152 in step 1002 may be greater than 1.5, greater than 1.8, greater than 2.0, greater than 2.2, greater than 2.4, greater than 2.5, etc.

Additionally at step 1102, a soft mask coating 156 is formed over the hard mask 154. Soft mask coating may be formed from a material having any desired refractive index. Soft mask coating will ultimately be removed from the final SRG structure, so the index of refraction of coating 156 does not impact the optical properties of the SRG structure. In step 1102, soft mask coating 156 is formed with a uniform thickness.

At step 1104, a sloped etching step may be performed (e.g., using one of the techniques of FIG. 7B or FIG. 7C). This causes soft mask 156 to have a sloped upper surface as shown in step 1104 of FIG. 11.

The example in steps 1102 and 1104 of forming a soft mask layer with a uniform thickness then etching the soft mask to have a sloped upper surface is merely illustrative. If desired, one of the techniques of FIG. 7A, 7D, or 7E may instead be used to form a soft mask having a sloped upper surface.

At step 1106, a patterning step is performed to define ridges 160 in soft mask layer 156. This patterning may be achieved using photolithography, nanoimprinting, electron beam lithography, or any other desired technique. After step 1006, high-index layer 152 still has a uniform thickness.

Finally, at step 1108, an etching step may remove soft mask 156 and form trenches (troughs) 80 in high-index material 152. The remaining portions of material 152 define high-index ridges 78 for the SRG structure. The etching step in step 1108 may have a low selectivity to soft mask 156, meaning that soft mask 156 and high-index material 152 etch at similar rates. Therefore, on the left side of the structure, where soft mask 156 is thickest, etching coating 156 will take a longer time and there is less time for etching of high-index material 152 to occur. This results in thicker ridges 78 on the left side of the structure. On the right side of the structure, where soft mask 156 is thinnest, the etching removes more high-index material 152. This results in thinner ridges on the right side of the structure.

After step 1108, the depth-modulated SRG structure may be used in the optical system 20B of device 10. As shown in step 1108 of FIG. 11, the SRG structure has ridges 78 that have a varying thickness 158 across the surface of substrate 76. A plane at a non-zero angle relative to the upper surface of substrate 76 may be coplanar (or approximately coplanar) with the upper surface of depth-modulated ridges 78 in FIG. 11.

There are several options to produce depth-modulated SRG structures. A first option, shown in FIGS. 8 and 9, is for ridges 78 to each have an upper surface that is a uniform distance 158 from the upper surface of substrate 76. The troughs have a varying depth to achieve the desired depth modulation. A second option, shown in FIGS. 10 and 11, is for ridges 78 to have upper surfaces that vary in distance from the upper surface of substrate 76 (e.g., the ridge thickness 158 varies). This achieves the desired depth modulation. A third option, shown in FIG. 12, is for substrate 76 to itself have a sloped surface.

Figure 12:
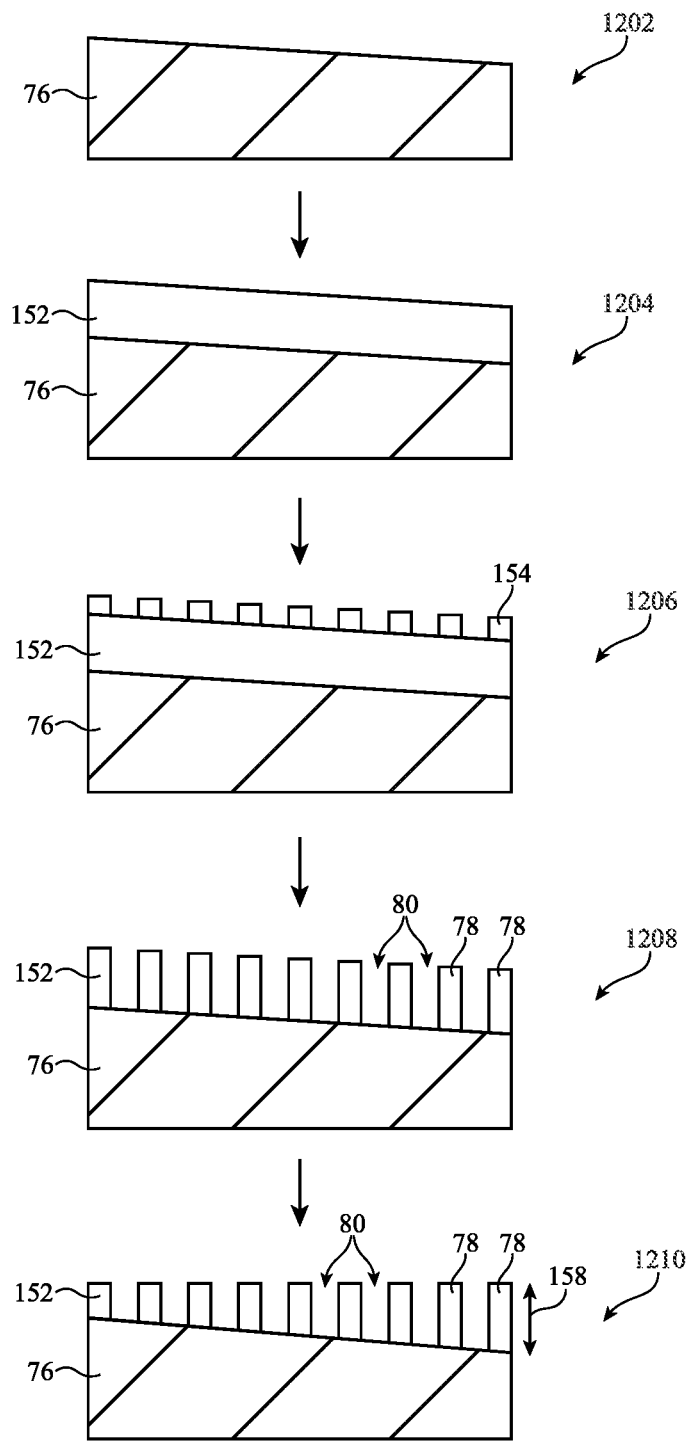
FIG. 12 is a diagram of illustrative method steps for forming depth-modulated surface relief grating structures having ridges on a sloped surface in accordance with some embodiments.

At step 1202 in FIG. 12, a substrate 76 is provided that has a sloped upper surface. The sloped upper surface of substrate 76 may be achieved using any of the techniques of FIGS. 7A-7E or any other desired technique. Substrate 76 may be formed from glass or another desired material. Substrate 76 may have a relatively high index of refraction (e.g., greater than 1.5, greater than 1.8, greater than 2.0, etc.).

Next, at step 1204, a high-index layer 152 is deposited over substrate 76. This deposition step may be performed using chemical vapor deposition (CVD), atomic layer deposition (ALD), high density plasma chemical vapor deposition (HDPCVP), physical vapor deposition (PVD), spin coating, or another desired technique. Material 152 may be titanium dioxide or another desired high-index material. The index of refraction of material 152 in step 802 may be greater than 1.5, greater than 1.8, greater than 2.0, greater than 2.2, greater than 2.4, greater than 2.5, etc.

After step 1204, high-index material 152 has a uniform thickness. Accordingly, the upper surface of high-index material 152 matches the slope of the sloped upper surface of substrate 76.

Next, at step 1206, a hard mask 154 is formed over high-index layer 152. Hard mask 154 may be patterned to cover the footprint of the ridges for the SRG structure. Hard mask 154 may be formed using photolithography, nanoimprinting, electron beam lithography, or any other desired technique.

At step 1208, an etching step is performed to remove the entire thickness of high-index layer 152 that is not covered by hard mask 154. This defines troughs 80 in the high-index layer that extend from the sloped upper surface of the high-index layer to the sloped upper surface of substrate 76. The hard mask is subsequently removed. After step 1208, ridges 78 have a uniform thickness.

Finally, at step 1210, chemical mechanical polishing (CMP) may be used to flatten the top surface of high-index layer 152. After the polishing is complete, the ridge structures 78 have coplanar upper surfaces. However, distance 158 between the upper surfaces of the ridges and the sloped upper surface of substrate 76 (e.g., the ridge thickness) varies across the SRG structure. The depth-modulated SRG structure of FIG. 12 may be used in the optical system 20B of device 10.

Figure 13:
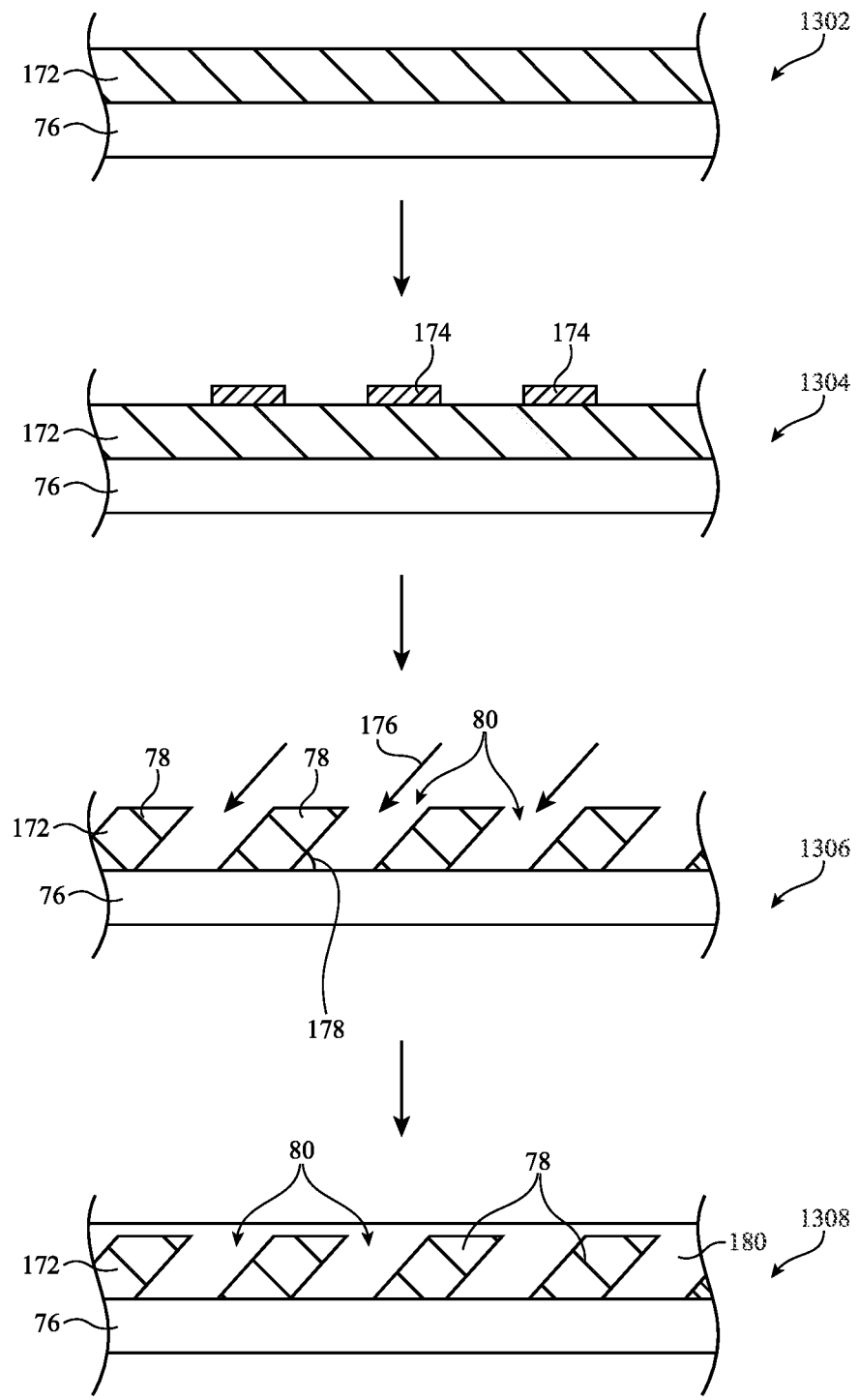
FIG. 13 is a diagram of illustrative method steps for forming surface relief grating structures including slanted ridges covered by encapsulant in accordance with some embodiments.
Figure 14:
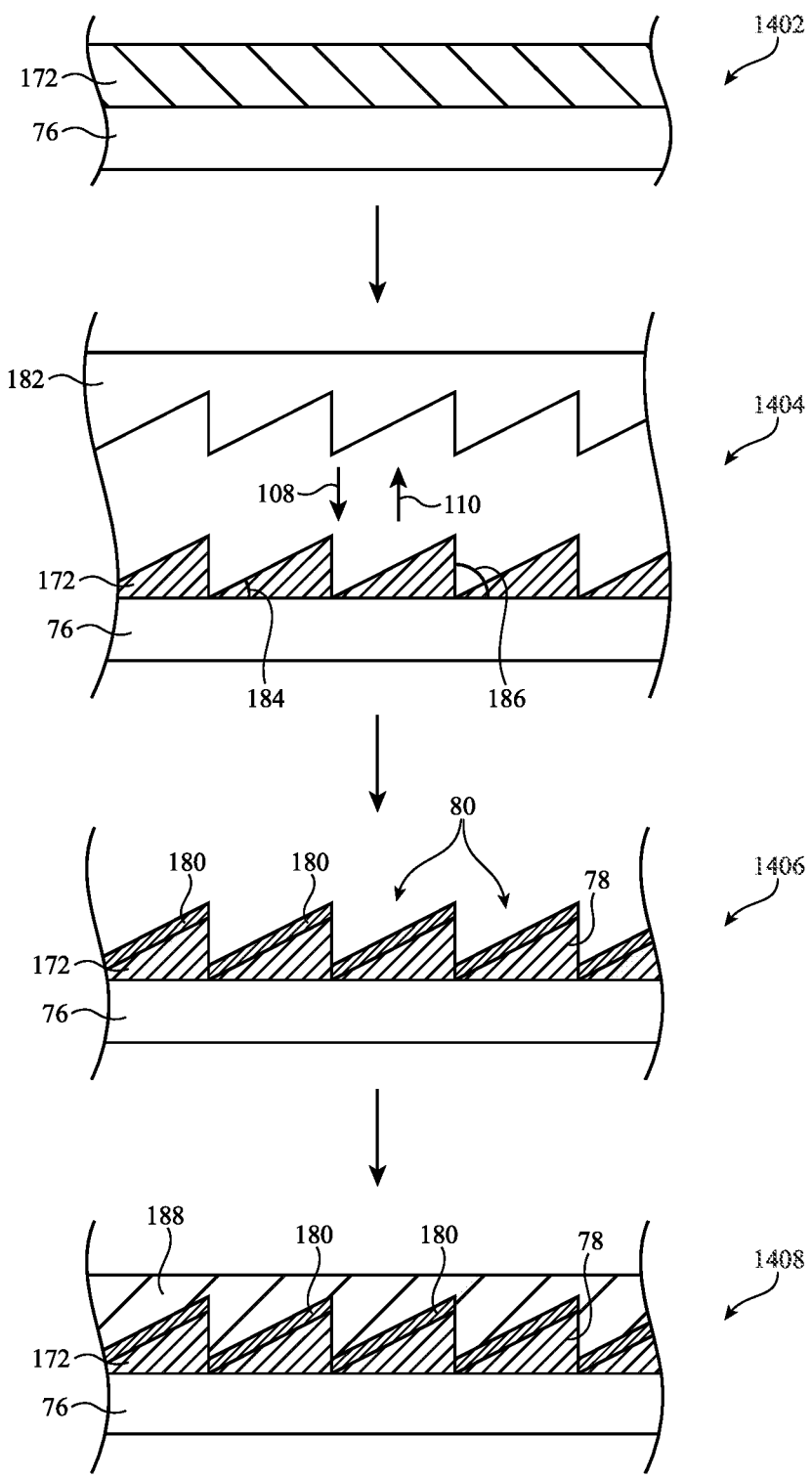
FIG. 14 is a diagram of illustrative method steps for forming surface relief grating structures including a blazed grating covered by encapsulant in accordance with some embodiments.

Additional methods of forming SRG structures are shown in FIGS. 13 and 14. FIG. 13 is a diagram showing method steps for forming slanted ridges for an SRG structure. At step 1302, a high-index material 172 may be deposited on SRG substrate 76. Substrate 76 may be formed from glass or another desired material. This deposition step may be performed using chemical vapor deposition (CVD), atomic layer deposition (ALD), high density plasma chemical vapor deposition (HDPCVP), physical vapor deposition (PVD), spin coating, or another desired technique. Material 172 may be silicon nitride or another desired high-index material. The index of refraction of material 172 in step 802 may be greater than 1.5, greater than 1.8, greater than 2.0, greater than 2.2, greater than 2.4, greater than 2.5, etc.

At step 1304, a masking layer 174 may be formed over high-index layer 172. Hard mask 174 may be patterned to cover the footprint of the high-index ridges for the SRG structure. Hard mask 174 may be formed using photolithography, nanoimprinting, electron beam lithography, or any other desired technique.

At step 1306, a slanted etching step is performed. The slanted etching step removes material that is not covered by masking layer 174. However, the etching is performed at an angle 176 relative to the upper surface of substrate 76. The resulting ridges 78 are separated by troughs 80 and have sidewalls that are at non-orthogonal angles 178 relative to the upper surface of substrate 76. The sidewall angle 178 of each ridge may be greater than 45 degrees, greater than 60 degrees, between 45 degrees and 70 degrees, between 30 degrees and 80 degrees, less than 80 degrees, less than 70 degrees, less than 60 degrees, less than 45 degrees, less than 40 degrees, etc. After the etching is completed, masking layer 174 is removed.

At step 1308, an encapsulation layer 180 is formed over slanted ridges 78. The encapsulation layer 180 conforms to ridges 78 and fills the troughs 80 between the ridges. The encapsulation layer 180 may have a lower refractive index than ridges 78 (e.g., by greater than 0.1, greater than 0.3, greater than 0.5, greater than 0.7, greater than 1.0, etc.). The index of refraction of material 180 in step 1308 may be less than 1.6, less than 1.5, less than 1.4, between 1.3 and 1.6, etc. Silicon dioxide or any other desired material may be used for material 180.

The encapsulation layer 180 may instead have a higher refractive index than ridges 78 (e.g., by greater than 0.1, greater than 0.3, greater than 0.5, greater than 0.7, greater than 1.0, etc.). The index of refraction of material 180 may be greater than 2.0, greater than 2.2, greater than 2.4, between 2.0 and 2.6, etc. However, forming encapsulation layer 180 with a lower refractive index than ridges 78 may result in a higher contrast than forming encapsulation layer 180 with a higher refractive index than ridges 78.

In FIG. 13, nanoimprinting may optionally be used instead of etching to form slanted ridges 78.

FIG. 14 is a diagram showing method steps for forming an SRG structure with a blazed grating. At step 1402, a high-index material 172 may be deposited on SRG substrate 76. Substrate 76 may be formed from glass or another desired material. This deposition step may be performed using chemical vapor deposition (CVD), atomic layer deposition (ALD), high density plasma chemical vapor deposition (HDPCVP), physical vapor deposition (PVD), spin coating, or another desired technique. Material 172 may be silicon nitride or another desired high-index material. The index of refraction of material 172 in step 1402 may be greater than 1.5, greater than 1.8, greater than 2.0, greater than 2.2, greater than 2.4, greater than 2.5, etc.

At step 1404, a nanoimprinting mold 182 is applied to high-index layer 172. The nanoimprinting mold 182 may be moved in direction 108 (e.g., to stamp the high-index layer) then in direction 110 (e.g., removed from the high-index layer). Nanoimprinting mold 182 has surface features that impart a desired shape onto high-index layer 76 (e.g., to define a blazed grating). As shown in FIG. 14, at step 1404, after nanoimprinting is completed, resin layer 172 may have remaining ridge structures 78 present on substrate 76 that form a blazed grating. The blazed grating may have a blaze angle 184 of between 15 degrees and 40 degrees and an anti-blaze angle 186 of 85 degrees or greater.

Next, at step 1406, the blazed grating is overcoated with a low refractive index material 180. The low-index coating layer 180 may have a lower refractive index than blazed ridges 78 (e.g., by greater than 0.1, greater than 0.3, greater than 0.5, greater than 0.7, greater than 1.0, etc.). The index of refraction of material 180 in step 1406 may be less than 1.6, less than 1.5, less than 1.4, between 1.3 and 1.6, etc. Silicon dioxide or any other desired material may be used for material 180.

The coating layer 180 may instead have a higher refractive index than ridges 78 (e.g., by greater than 0.1, greater than 0.3, greater than 0.5, greater than 0.7, greater than 1.0, etc.). The index of refraction of material 180 may be greater than 2.0, greater than 2.2, greater than 2.4, between 2.0 and 2.6, etc. However, forming coating layer 180 with a lower refractive index than ridges 78 may result in a higher contrast than forming encapsulation layer 180 with a higher refractive index than ridges 78.

Finally, at step 1408, an encapsulation layer 188 is formed over the coated blazed grating. The encapsulation layer 188 conforms to ridges 78 and coating 180 and fills the troughs 80 between the ridges. Encapsulation layer 188 may be formed from the same high-index material as layer 172. An anti-reflection coating may optionally be added to the upper surface of encapsulation layer 188.

It should be noted that, if desired, the nanoimprinting mold 182 from step 1404 may be formed using anisotropic silicon etching. Anisotropic silicon etching may be used to form asymmetric grooves in silicon. These asymmetric grooves may be leveraged to form the nanoimprinting mold 182 for the method of FIG. 14. For example, anisotropic silicon etching using a crystal orientation of (112) and a mask orientation of <110>, anisotropic silicon etching using a crystal orientation of (113) and a mask orientation of <110>, or another desired type of anisotropic silicon etching may be used. Anisotropic silicon etching using a crystal orientation of (112) and a mask orientation of <110> may result in an asymmetric groove in the silicon with an open angle of 70.5 degrees, a first sidewall angle of 19.5 degrees, and a second sidewall angle of 90.0 degrees. Anisotropic silicon etching using a crystal orientation of (113) and a mask orientation of <110> may result in an asymmetric groove in the silicon with an open angle of 70.5 degrees, a first sidewall angle of 29.5 degrees, and a second sidewall angle of 80.0 degrees. These angles, similar angles (e.g., within 5% of these values, within 1% of these values, etc.), or complementary/supplementary angles to these angles may be used in nanoimprinting mold 182 and/or blazed grating 78 to simplify manufacturing.

The SRG structures produced using any of the aforementioned techniques may have any desired pitch, duty cycle, dimensions, etc. As examples, the magnitude of the height of each ridge (and/or the depth of each trough) may be greater than 50 nanometers, greater than 100 nanometers, greater than 200 nanometers, greater than 300 nanometers, greater than 500 nanometers, greater than 750 nanometers, greater than 1000 nanometers, less than 50 nanometers, less than 100 nanometers, less than 200 nanometers, less than 300 nanometers, less than 500 nanometers, less than 750 nanometers, less than 1000 nanometers, between 200 nanometers and 400 nanometers, between 100 nanometers and 750 nanometers, between 50 nanometers and 1000 nanometers, etc. Each ridge may have a width that is greater than 50 nanometers, greater than 100 nanometers, greater than 200 nanometers, greater than 300 nanometers, greater than 500 nanometers, less than 50 nanometers, less than 100 nanometers, less than 200 nanometers, less than 300 nanometers, less than 500 nanometers, between 50 nanometers and 300 nanometers, etc. The center-to-center spacing between the ridges (pitch) may be any desired magnitude (e.g., greater than 50 nanometers, greater than 100 nanometers, greater than 200 nanometers, greater than 300 nanometers, greater than 500 nanometers, greater than 750 nanometers, greater than 1000 nanometers, less than 50 nanometers, less than 100 nanometers, less than 200 nanometers, less than 300 nanometers, less than 500 nanometers, less than 750 nanometers, less than 1000 nanometers, between 200 nanometers and 400 nanometers, between 100 nanometers and 750 nanometers, etc.). The duty cycle of the ridges (defined as ridge width divided by ridge pitch) may be greater than 60%, greater than 70%, greater than 80%, greater than 90%, greater than 95%, less than 99%, less than 70%, less than 80%, less than 90%, less than 95%, between 60% and 99%, etc.

Optical system 20B may include one or more optical couplers (e.g., an input coupler, a cross-coupler, and an output coupler) formed at or on a waveguide. As examples, the optical system may have a sequential architecture or a combined architecture.

In a sequential architecture, image light may be directed to an input coupler, a cross coupler, and an output coupler in that order. As a specific example, a cross coupler may be at least partially laterally interposed between an input coupler (e.g., an input prism) and an output coupler. The input coupler may be laterally interposed between the cross coupler and an edge of the waveguide. The input prism may couple light into the waveguide. A cross coupler may expand the in-coupled light in a first direction and may provide the light to the output coupler. The output coupler may expand the light in a second direction that is different than the first direction.

In a combined architecture, image light may be directed from an input coupler to a combined optical coupler that performs the function of both a cross coupler and an output coupler. It may be desirable for the output coupler on the waveguide to fill as large of an eye box with as uniform-intensity image light as possible. The combined optical coupler may perform the functionality of both a cross-coupler and an output coupler for the waveguide. The combined optical coupler may therefore be configured to expand image light in one or more dimensions while also coupling the image light out of the waveguide. By using a combined optical coupler in this manner, space may be conserved within the display.

Any of the SRG structures described herein may be used to form any optical coupler (e.g., an input coupler, a cross coupler, an output coupler, a combined optical coupler that performs the function of both a cross coupler and an output coupler, etc.) in optical systems with either a sequential architecture or a combined architecture.

The foregoing is merely illustrative and various modifications can be made to the described embodiments. The foregoing embodiments may be implemented individually or in any combination.

What is claimed is:

1. A method of forming a surface relief grating comprising:
   depositing a first material on a substrate;
   nanoimprinting the first material to form a first plurality of ridges formed from the first material; and
   depositing a second material over the first plurality of ridges, wherein the second material forms a second plurality of ridges for the surface relief grating, wherein the second plurality of ridges is formed between the first plurality of ridges, wherein the first plurality of ridges alternates with the second plurality of ridges, and wherein the second material has a higher index of refraction than the first material.

2. The method defined in claim 1, further comprising:
   removing some of the second material, wherein removing some of the second material results in the first and second pluralities of ridges having a single planar upper surface.

3. The method defined in claim 2, further comprising:
   applying an anti-reflection coating over the single planar upper surface.

4. The method defined in claim 2, further comprising:
   removing the first plurality of ridges, wherein removing the first plurality of ridges causes only the second plurality of ridges to be present on the substrate.

5. The method defined in claim 4, wherein removing the first plurality of ridges comprises etching the first material.

6. The method defined in claim 1, wherein each one of the second plurality of ridges has a width that is less than 1000 nanometers and a height that is less than 1000 nanometers.

7. The method defined in claim 1, wherein the second material comprises titanium dioxide or a material with an index of refraction that is greater than 1.8.

8. The method defined in claim 2, further comprising:
   applying a coating over the single planar upper surface.

9. A method comprising:
   depositing a first material on a first substrate while the first substrate is unwound from a first roller;
   nanoimprinting the first material to define a first plurality of ridges;
   depositing a second material on the first substrate and the first plurality of ridges while the first substrate is unwound, wherein the second material has a higher index of refraction than the first material;
   applying a second substrate to the second material;
   curing the second material while the second material is attached to the second substrate; and
   removing the second substrate with the cured second material.

10. The method defined in claim 9, wherein depositing the second material on the first substrate and the first plurality of ridges forms a second plurality of ridges between the first plurality of ridges.

11. The method defined in claim 10, wherein applying the second substrate to the second material comprises applying the second substrate to the second plurality of ridges.

12. The method defined in claim 11, further comprising:
   after nanoimprinting the first material to define the first plurality of ridges, depositing an anti-stick coating over the first plurality of ridges, wherein the anti-stick coating conforms to the first plurality of ridges and the first substrate.

13. The method defined in claim 9, wherein nanoimprinting the first material to define the first plurality of ridges comprises:
   applying a nanoimprinting mold to the first material; and
   exposing the first material to ultraviolet light while applying the nanoimprinting mold to the first material.

14. The method defined in claim 9, wherein curing the second material comprises exposing the second material to ultraviolet light.

15. The method defined in claim 9, wherein the first substrate comprises plastic and wherein the second substrate comprises glass.

16. The method defined in claim 9, further comprising:
   after removing the second substrate with the cured second material, dicing the second substrate with the cured second material to form a plurality of surface relief grating structures.

17. A method of forming a depth-modulated surface relief grating comprising:
   forming a high-index layer over a substrate;
   forming a patterned hard mask over the high-index layer;
   forming a sloped layer over the patterned hard mask and the high-index layer; and
   etching the sloped layer and the high-index layer through the hard mask.

18. A method of forming a depth-modulated surface relief grating comprising:
   forming a high-index layer over a substrate;
   forming a patterned hard mask over the high-index layer; and
   etching the high-index layer through the patterned hard mask in a sloped manner to form troughs of varying depths in the high-index layer.

19. A method of forming a depth-modulated surface relief grating comprising:
   forming a sloped high-index layer over a planar substrate;
   forming a patterned hard mask over the sloped high-index layer; and
   etching the sloped high-index layer through the patterned hard mask.

20. A method of forming a depth-modulated surface relief grating comprising:
   forming a high-index layer having a uniform thickness over a substrate;
   forming a sloped layer over the high-index layer;
   patterning the sloped layer to have a first plurality of ridges; and
   etching the first plurality of ridges and the high-index layer to produce a second plurality of ridges in the high-index layer having varying heights.

21. A method of forming a depth-modulated surface relief grating comprising:
   forming a high-index layer having a uniform thickness over a substrate with a sloped upper surface;
   forming a patterned hard mask over the high-index layer;
   etching the high-index layer through the patterned hard mask to form a plurality of ridges in the high-index layer having uniform heights; and
   removing portions of the plurality of ridges to cause the plurality of ridges to have non-uniform heights.

* * * * *